Aug. 21, 1923.
W. E. LEARY
SAW SET
Filed Oct. 26, 1921
1,465,606
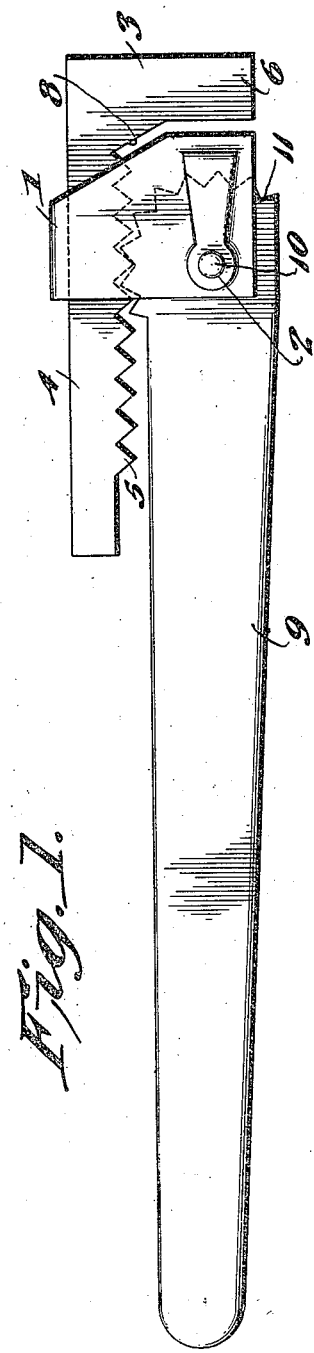
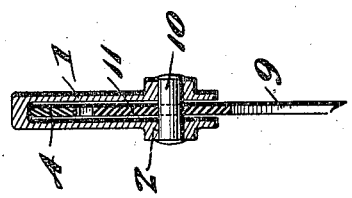
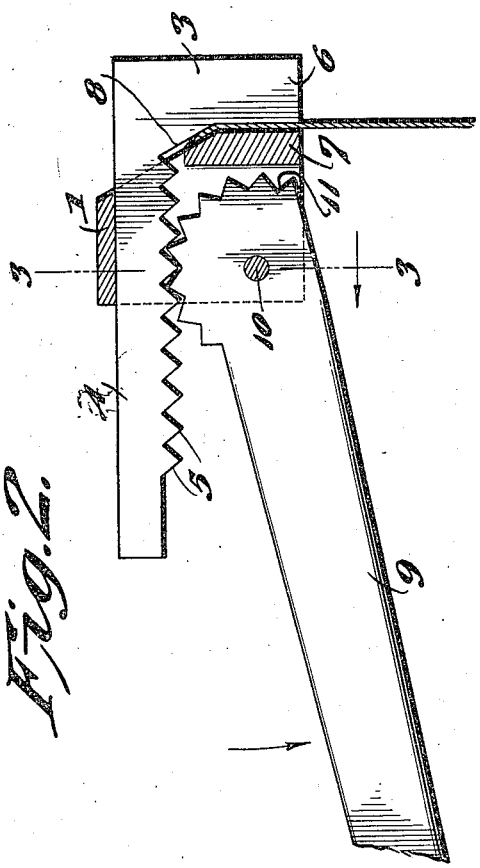
Inventor
W. E. Leary
By McCracker & Batch
his Attorneys Patented Aug. 21, 1923.

1,465,606

UNITED STATES PATENT OFFICE.

WILLIAM E. LEARY, OF PLACERVILLE, IDAHO.

SAW SET.

Application filed October 26, 1921. Serial No. 510,453.

*To all whom it may concern:*

Be it known that I, WILLIAM E. LEARY, a citizen of the United States, residing at Placerville, in the county of Boise and State of Idaho, have invented certain new and useful Improvements in Saw Sets, of which the following is a specification.

This invention relates to saw sets, and particularly to a device adapted for individual use.

An object is to provide a saw set which is readily portable and which is so constructed that by manual manipulation of the parts the teeth of a saw are bent and made to conform to an anvil portion, thus insuring that the same degree of offset is given to each tooth of the saw.

A further object resides in so constructing the parts that the device is placed over the toothed edge of a saw and located on the tooth to be set after which a handle is operated with a prying force to bend the tooth in the direction in which the prying force is exerted.

Another object lies in providing a device of this character which is composed of but few parts inexpensively manufactured and assembled, and with which there is little likelihood of the parts becoming broken or disarranged in use.

With these and other objects in view which will be apparent from the specification, claims and drawings, this invention includes certain novel features of construction and combinations of parts which will now be set forth.

In the drawings:

Figure 1 is a view in side elevation.

Fig. 2 is a view similar to Fig. 1 with the housing shown in section.

Fig. 3 is a sectional view on line 3—3 of Fig. 2.

The housing 1 is of substantially U-shaped form and is provided with bearing openings 2. A forming member 3 has an extension 4 adapted to fit and slide through the housing 1 and provided with rack teeth 5 on one edge of the extension. This member 3 has a hook end 6 and the housing 1 has a forming anvil portion 7 which is adjacent the hook end 6. This hook end and the housing 1 are formed with an angular offset as at 8, corresponding substantially to the angle of set desired to be given to the saw teeth.

A handle 9 is mounted within the housing by a bearing pin 10 fitted in the bearing openings 2, and this handle has a curved rack 11 intermeshing with the rack teeth 5 of extension 4. The arrangement of the handle is such that when the handle is swung down, with respect to housing 1, in the direction indicated by the arrow in Fig 2 the hooked end 6 of forming member 3 is drawn toward the anvil portion 7 of the housing.

In the use of my improved saw set the structure, with the handle raised as shown in Fig. 1, is placed with the hooked end of member 3 over the toothed edge of the saw and is adjusted to bring the tooth to be set within the offset at 8. The handle is then grasped and pushed down, as shown in Fig. 2, with a prying force which causes the housing to move toward the hooked end. In this way the tooth is clamped between the hook 6 and anvil portion 7 and is positively bent to the form of the offset 8 by a prying force exerted upon the handle in the direction in which it is desired to bend the tooth. The forming member 3 will be made comparatively thin so that the tool can be used upon saws having fine teeth, and it will be appreciated that teeth of different lengths can be set, the offset 8 being sufficiently long to take the maximum length of tooth. The angle of offset at 8 can be varied to give a greater or lesser angle of set to the teeth where saws for particular uses are desired to be set.

While, in the foregoing, I have described specific embodiments, and have mentioned only certain possible modifications, it will be appreciated that in practice I do not limit myself to such specific details as herein set forth, but may resort to any practical modifications falling within the scope of the invention as defined in the appended claim.

I claim:

A saw set comprising a substantially U-shaped housing having a forming anvil portion, a forming member provided with a rack bar extension slidable within the housing and having a hooked end extending adjacent the anvil portion of the housing, and a handle pivoted within the housing provided with a curved rack portion interfitting with the rack teeth of the extension to draw the hooked end of the forming member toward the housing as the handle is swung.

In testimony whereof I affix my signature.

WILLIAM E. LEARY.